(12) United States Patent
Asaro et al.

(10) Patent No.: US 7,805,560 B2
(45) Date of Patent: Sep. 28, 2010

(54) METHODS AND APPARATUS FOR TRANSLATING MESSAGES IN A COMPUTING SYSTEM

(75) Inventors: Anthony Asaro, Toronto (CA); Joe Scanlon, Sunnyvale, CA (US); Bo Liu, Richmond Hill (CA)

(73) Assignee: ATI Technologies Inc., Markham, Ontario (CA)

( * ) Notice: Subject to any disclaimer, the term of this patent is extended or adjusted under 35 U.S.C. 154(b) by 0 days.

(21) Appl. No.: 11/162,165

(22) Filed: Aug. 31, 2005

(65) Prior Publication Data

US 2007/0055807 A1    Mar. 8, 2007

(51) Int. Cl.
G06F 13/36   (2006.01)
G06F 13/20   (2006.01)
G06F 15/16   (2006.01)
G06F 13/00   (2006.01)
G06F 9/34    (2006.01)
H04L 12/56   (2006.01)

(52) U.S. Cl. .................. 710/315; 710/34; 710/313; 709/249; 711/202; 370/395.5

(58) Field of Classification Search ............. 710/313, 710/315, 34; 709/249; 711/202; 370/395.5
See application file for complete search history.

(56) References Cited

U.S. PATENT DOCUMENTS

| 3,996,564 | A | * | 12/1976 | Kerrigan et al. ............ 710/48 |
| 4,446,844 | A | * | 5/1984 | Nishioka ................. 124/44.5 |
| 5,568,613 | A | * | 10/1996 | Futral .................... 709/249 |
| 5,793,993 | A | * | 8/1998 | Broedner et al. ........... 710/106 |
| 6,195,734 | B1 | * | 2/2001 | Porterfield ............... 711/203 |
| 6,301,632 | B1 | * | 10/2001 | Jaramillo ................. 710/105 |
| 6,429,682 | B1 | * | 8/2002 | Schultz et al. ............ 326/41 |
| 6,684,284 | B1 | | 1/2004 | Lai et al. |
| 6,754,759 | B1 | * | 6/2004 | Cook et al. ............... 710/305 |
| 6,809,547 | B2 | * | 10/2004 | Ingino et al. .............. 326/30 |
| 6,920,519 | B1 | * | 7/2005 | Beukema et al. ........... 710/306 |
| 6,925,519 | B2 | * | 8/2005 | Day et al. ................ 710/315 |
| 6,988,161 | B2 | * | 1/2006 | McConnell et al. ......... 710/316 |
| 6,996,659 | B2 | * | 2/2006 | Lupien et al. ............. 710/315 |
| 7,009,618 | B1 | * | 3/2006 | Brunner et al. ............ 345/566 |
| 7,024,503 | B2 | * | 4/2006 | Peng ..................... 710/105 |
| 7,032,060 | B2 | * | 4/2006 | Yu et al. .................. 710/313 |
| 7,088,726 | B1 | * | 8/2006 | Hamamoto et al. ......... 370/401 |

(Continued)

OTHER PUBLICATIONS

Hypertransport tm Technology Consortium;Hypertransport Link I/O specification; Hypertransport Technology consortium, revision 1.10, Aug. 25, 2003, pp. 1, 3,142-152, 190, 220.*

(Continued)

Primary Examiner—Mark Rinehart
Assistant Examiner—Christopher A Daley
(74) Attorney, Agent, or Firm—Vedder Price P.C.

(57) ABSTRACT

Methods and apparatus for translating messages in a computing system are disclosed. In particular, a disclosed method for converting messages in a computer system includes receiving a command message from a processing unit where the message is defined according to a transport protocol that utilizes command messages using an address to communicate commands to devices in the computer system. The command message is translated to an interface standard by mapping the address into an address field of a packet constructed according to the interface standard. Corresponding apparatus that perform the methods are also disclosed.

29 Claims, 4 Drawing Sheets

U.S. PATENT DOCUMENTS

| | | | |
|---|---|---|---|
| 7,194,607 B2* | 3/2007 | Dahlen et al. | 712/227 |
| 7,266,587 B2* | 9/2007 | Rowlands | 709/214 |
| 7,313,146 B2* | 12/2007 | Moll et al. | 370/413 |
| 7,394,823 B2* | 7/2008 | Sano | 370/419 |
| 2003/0163590 A1 | 8/2003 | Cheng | |
| 2003/0188071 A1* | 10/2003 | Kunjan et al. | 710/305 |
| 2004/0024949 A1* | 2/2004 | Winkler et al. | 710/315 |
| 2004/0109473 A1* | 6/2004 | Lebizay et al. | 370/466 |
| 2004/0177126 A1* | 9/2004 | Maine | 709/217 |
| 2004/0186942 A1 | 9/2004 | Olarig | |
| 2005/0188105 A1* | 8/2005 | Reinhard et al. | 709/238 |
| 2005/0203923 A1* | 9/2005 | Shand | 707/100 |
| 2005/0235092 A1* | 10/2005 | Ballew et al. | 710/316 |
| 2005/0251567 A1* | 11/2005 | Ballew et al. | 709/223 |
| 2006/0101179 A1 | 5/2006 | Lee et al. | |

OTHER PUBLICATIONS

Hypertransport Technology Consortium, HyperTransport I/O link specification revision 1.10, pp. 33-48,144,190,204-209.*

Intel; Intel Low Pin Count (LPC) Interface Specification; Aug. 2002; Revision 1.1; pp. 1-54.

PCI Express Base Specification Revision 1.1; Mar. 28, 2005; pp. 1-508.

Alliance Semiconductor, AS90L 10204 HyperTransport tm to PCI-X Bridge, User's Manual, Jul. 16, 2004, pp. 1-35, 62, 104.

Declaration of Antonio Asaro dated Apr. 23, 2008; pp. 1-5.

"HyperTransport™ I/O Link Specification, Revision 1.05c"; Document #HTC2002104-0005-0005; Aug. 5, 2003; HyperTransport Technology Consortium.

"Advanced Configuration and Power Interface Specification, Revision 2.0b;" Oct. 11, 2002; Compaq Computer Corporation, Intel Corporation, Microsoft Corporation, Phoenix Technologies Ltd., and Toshiba Corporation.

"AMD-8151™ HyperTransport™ AGP3.0 Graphics Tunnel Data Sheet;" 24888 Rev 3.03—Jul. 12, 2004; Advanced Micro Devices, Inc.

"Clock Generator Specification for AMD64 Processors;" Publication # 24707 Revision: 3.08; Sep. 2003; Advanced Micro Devices, Inc.

"HyperTransport™ Technology I/O Link—A High-Bandwidth I/O Architecture;" Jul. 20, 2001; Advanced Micro Devices, Inc.

* cited by examiner

FIG. 1

HyperTransport™ Technology Address Map

| Base Address | Top Address | Size | Use |
|---|---|---|---|
| 0000 0000 0000 0000h | 0000 00FC FFFF FFFFh | 1012 Gbytes | System Memory Memory-Mapped I/O |
| 0000 00FD 0000 0000h | 0000 00FD F8FF FFFFh | 3984 Mbytes | Interrupt I/O |
| 0000 00FD F900 0000h | 0000 00FD F90F FFFFh | 1 Mbyte | Legacy PIC IACK |
| 0000 00FD F910 0000h | 0000 00FD F91F FFFFh | 1 Mbyte | System Management |
| 0000 00FD F920 0000h | 0000 00FD F92F FFFFh | 1 Mbyte | Reserved — x86 |
| 0000 00FD F930 0000h | 0000 00FD FBFF FFFFh | 45 Mbytes | Reserved |
| 0000 00FD FC00 0000h | 0000 00FD FDFF FFFFh | 32 Mbytes | I/O |
| 0000 00FD FE00 0000h | 0000 00FD FFFF FFFFh | 32 Mbytes | Configuration |
| 0000 00FE 0000 0000h | 0000 00FE 1FFF FFFFh | 512 Mbytes | Extended Config Device Message |
| 0000 00FE 2000 0000h | 0000 00FF FFFF FFFFh | 7680 Mbytes | Reserved |
| 0000 0100 0000 0000h | FFFF FFFF FFFF FFFFh | 16 Exabytes | System Memory Memory-Mapped I/O |

*FIG. 2*

System Management Message Packet Format

METHODS AND APPARATUS FOR TRANSLATING MESSAGES IN A COMPUTING SYSTEM

FIELD OF THE INVENTION

The present disclosure relates to methods and apparatus used to translate messages within a computing system and, more particularly for translating messages formatted according to one protocol in order to transmit those messages according to a second protocol.

BACKGROUND OF THE INVENTION

In certain types of computing systems that include a central processing unit (CPU) and a host bridge or what is known as a "Northbridge," such devices are connected by an interface using a particular protocol in order for the CPU and Northbridge to communicate. One such protocol known in the art is HyperTransport™, which provides a high speed, point-to-point link for interconnecting integrated circuits within a computing system. Typically, however, Northbridge circuits communicate with other devices in the system, such as input-output bridges (e.g., a "Southbridge") according to different protocols, including PCI Express. Accordingly, when a CPU is trying to communicate with a Southbridge via the Northbridge and the CPU communicates with the Northbridge via HyperTransport™ protocol and the Northbridge, in turn, communicates with the Southbridge via PCI Express protocol, not all message types or formats are easily passed through the Northbridge to communicate the commands or requests from the CPU to the Southbridge.

Types of messages in HyperTransport™ protocol that do not easily pass through the Northbridge, as an example, are what are termed "Broadcast" messages, which simply provide a memory address, but no data field in order to communicate different and various commands to the Southbridge. This is problematic in some types of Northbridges that are configured to communicate commands via PCI Express to the Southbridge using a different packet construction including a data field, for example. Thus, it becomes necessary to convert these Broadcast messages of HyperTransport™, as an example, to a format usable and recognizable by the communication link between the Northbridge and Southbridge in order to ensure simplification of the system, as well as avoiding, for example, further connections of the interface between the Northbridge and Southbridge such as using a different communication link to accommodate the non-compatible messages.

It is noted that the following documents are known in the art concerning HyperTransport™ technology and PCI and their functioning. The following documents are incorporated herein by reference:

1) "HyperTransport™ I/O Link Specification, Revision 1.05c"; Document #HTC2002104-0005-0005; Aug. 5, 2003; HyperTransport Technology Consortium.
2) "HyperTransport™ I/O Link Errata, Revision 1.05b"; Document #HTC200335-0024-0003; Apr. 2, 2003, Hyper-Transport Technology Consortium.
3) "Advanced Configuration and Power Interface Specification, Revision 2.0b;" Oct. 11, 2002; Compaq Computer Corporation, Intel Corporation, Microsoft Corporation, Phoenix Technologies Ltd., and Toshiba Corporation.
4) "AMD-8151™ HyperTransport™ AGP3.0 Graphics Tunnel Data Sheet;" 24888 Rev 3.03—Jul. 12, 2004; Advanced Micro Devices, Inc.
5) "Clock Generator Specification for AMD64 Processors;" Publication # 24707 Revision: 3.08; September 2003; Advanced Micro Devices, Inc.
6) "HyperTransport™ Technology I/O Link—A High-Bandwidth I/O Architecture;" Jul. 20, 2001; Advanced Micro Devices, Inc.

DETAILED DESCRIPTION OF THE PRESENT EMBODIMENTS

The present disclosure relates to methods and apparatus for translating messages in a computing system. In particular, a disclosed method for converting messages in a computer system includes receiving a command message from a processing unit where the message is defined according to a transport protocol that utilizes command messages using an address to communicate commands to devices in the computer system. The command message is translated to a message defined by a different transport protocol by mapping the address into an address field of a packet constructed according to the different transport protocol.

A disclosed apparatus for converting messages is also disclosed, which includes a bridge circuit configured to convert messages received from at least one processor. The bridge circuit includes logic configured to receive a command message from at least one processor where the message is defined according a transport protocol that utilizes command messages using an address to communicate commands to devices in the computer system. The logic is also configured to then translate the command message to a message defined by a different transport protocol by mapping the address into an address field of a packet constructed according to the different transport protocol.

In computer systems employing a transfer protocol utilizing command messages using an address to communicate commands, such as HyperTransport™, between a central processing unit (CPU) and a Northbridge and also utilizing a message defined by a different transport protocol , such as PCI Express for interconnecting a Northbridge to a Southbridge, the presently-disclosed methods and apparatus afford a simplified methodology or apparatus to communicate messages from the CPU to the Southbridge. Additionally, translation allows an existing PCI Express bus path to be utilized instead of a different communication link.

Figure 1:
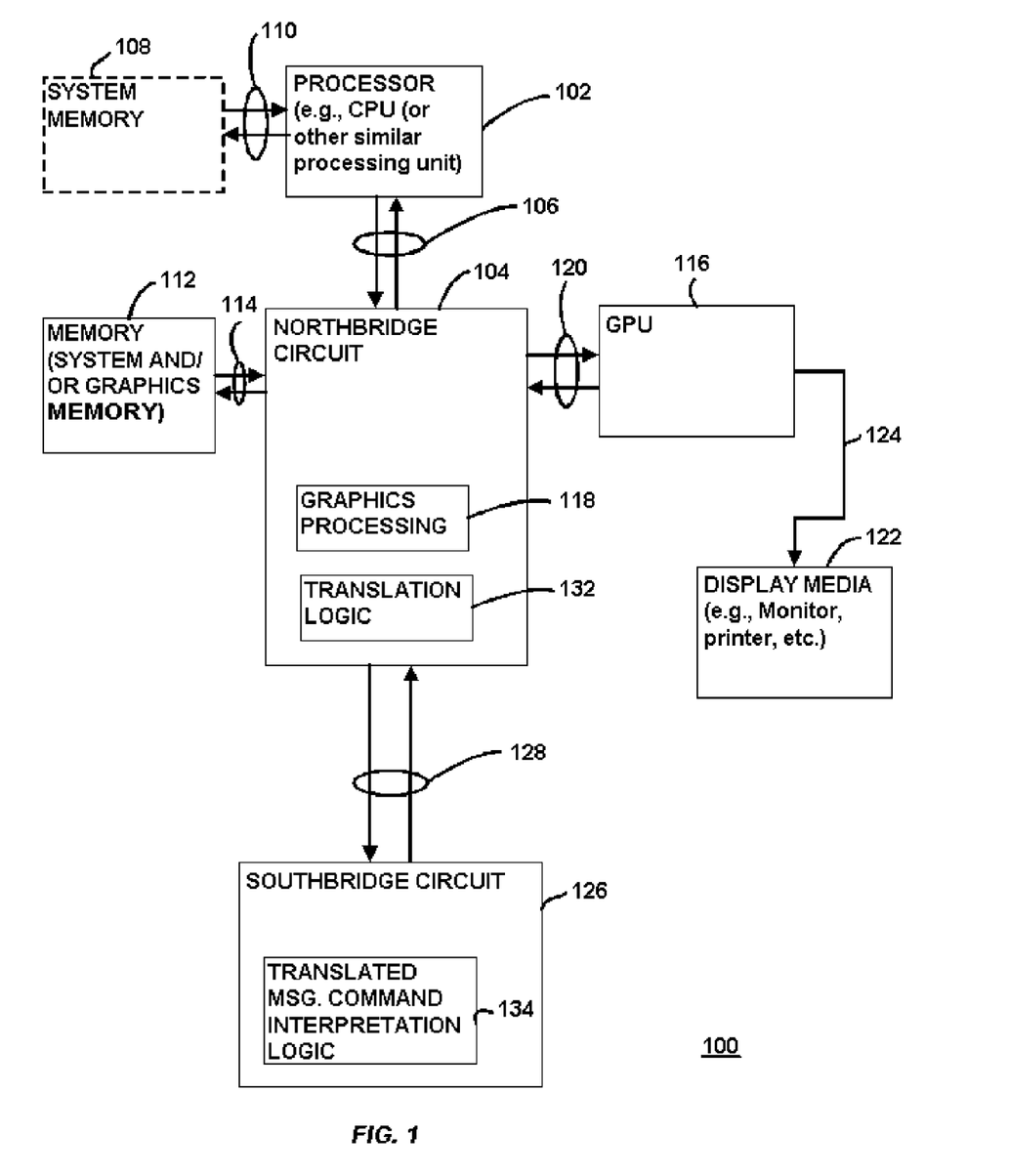
FIG. 1 illustrates an example of a computing system in accordance with the present disclosure.

FIG. 1 illustrates an example of a computer system 100 in which the presently-disclosed apparatus and methods may be utilized. As shown, the system 100 includes a processor 102, which may be a central processing unit (CPU), multiple processors, or any other similar processing unit. The processor 102 is interfaced to a bridge circuit, such as a memory interface bridge, host bridge, or a Northbridge 104 via an interface 106. In particular, for purposes of example, this interface 106 operates according to the HyperTransport™ protocol, but may be any other suitable interface in which some requests utilize a memory address without data in order to communicate certain commands. The system 100 also may include a system memory 108 connected directly to the processor 102 with an interface 110, such as an interface operating according to PCI Express, PCI, AGP or any other suitable interface standard.

The Northbridge circuit 104 is also connected to a memory 112, which may be a system memory and also may include graphics memory or simply the graphics memory utilized by a graphics processing unit 116 connected to the Northbridge 104 or graphics processing circuitry 118 internal to the Northbridge circuit 104. The memory 112 is interfaced with the Northbridge 104 via an interface 114, which may operate according to DDR1/DDR2 or any other suitable standard for interfacing with memory. Additionally, the graphics processing unit 116 is interfaced by an interface 120 with the Northbridge circuit 104 and also may operate according to any suitable standard, such as PCI, PCI Express or AGP. The graphics processing unit 116 may drive a display media 122, such as a monitor, printer, or any other suitable display device 122 via an analog bus 124.

The Northbridge circuit 104, as shown in FIG. 1 also interfaces with a Southbridge circuit, which may be used to interface with any one of numerous types of devices, such as keyboards, mouse devices, hard drives, floppy drives, USB devices, ROMs and PCI bus cards. The Northbridge 104 and Southbridge 126 are interfaced with an interface 128, which may operate according to any suitable standard. For purposes of the present disclosure, the interface 128 operates according to PCI Express or any other suitable equivalent interface protocol.

Particular to the presently disclosed methods and apparatus, the Northbridge circuit 104 includes translation logic 132 that is used to translate or correlate between requests and messages from the CPU 102 via interface 106 operating according to HyperTransport™ protocol and the interface 128 between the Northbridge 104 and Southbridge 126 operating according to PCI Express, for example. Furthermore, the Southbridge circuit 126 includes translated command message interpretation logic 134 that is used, for example, to interpret the translated command message from the CPU, which have been translated by the translation logic 132 in the Northbridge circuit 104. The translated command interpretation logic 134 may be located in any suitable location and in this example is shown in the Southbridge 126. The translated command message interpretation logic 134 uses the address in the received translated command and compares the address to an address map of the other transport protocol (e.g., Hypertransport™) to determine if the packet includes a translated command message and, if so, the type of command message. For example if the address is in a certain range, the interpretation logic 134 determines the type of command message (e.g., broadcast message) that was translated by the translation logic 132. Any other suitable interpretation scheme may also be used. The system 100 includes both translation logic and corresponding translated command message interpretation logic.

Figure 2:
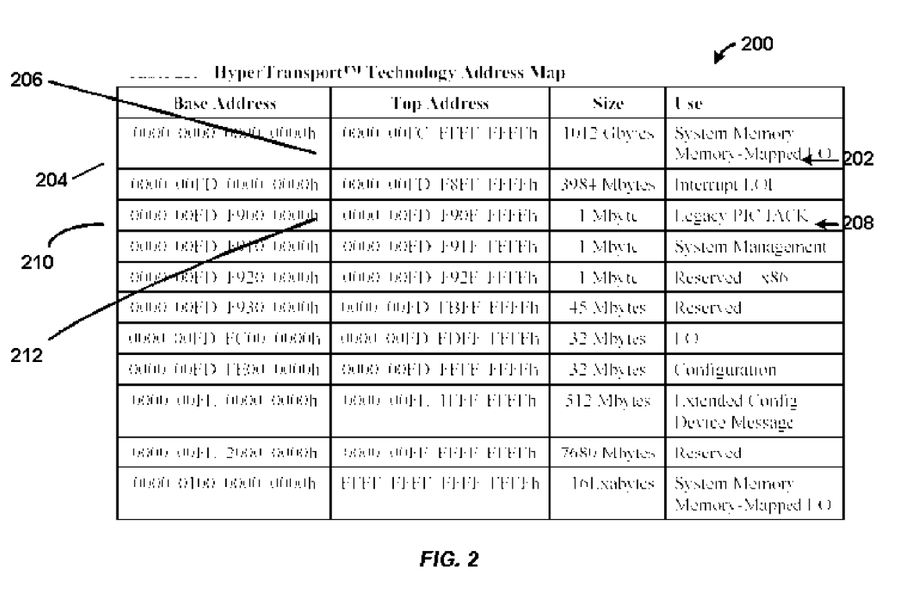
FIG. 2 illustrates an address map utilized in an exemplary protocol such as HyperTransport™ technology.

FIG. 2 illustrates an address map 200 which is utilized by the HyperTransport™ protocol. As shown in this figure, ranges from a base address to a top address for particular messages are illustrated. Of particular interest are what are known as "Broadcast" messages utilized by HyperTransport™. These Broadcast messages are used to send commands or messages globally throughout a computing system, such as system 100 illustrated in FIG. 1. Different types of Broadcast messages used in the HyperTransport™ protocol include Interrupt/End of Interrupt (EOI) and System Management messages. As illustrated in FIG. 2, interrupt/EOI messages 202 utilize addresses between a base address 204 and a top address 206 and System Management messages 208 utilize addresses between a base address 210 and a top address 212. In particular, HyperTransport™ technology utilizes a generic message-based interrupt system. The information carried in these messages is implementation specific. The address range is used to send interrupt requests/acknowledgements between an interrupting device (e.g., CPU 102) and a bridge (e.g., Southbridge 126). The interrupt requests, in particular, are sent from the CPU 102 and the acknowledgements are sent back from the bridge (e.g., Southbridge 126) in response. In Broadcast message packets, in particular, Broadcast messages, having these reserved address ranges associated with them, are recognized by all HyperTransport™ enabled devices, such as Northbridge circuit 104 in the example of FIG. 1. All information, including potential write data, necessary to the specific type of operation dictated by the command associated with the transmitted address that is to be performed is carried in the address field and not as separate data.

As discussed previously, Broadcast messages received in the Northbridge circuit 104 from the CPU 102, which need to be passed on to the Southbridge circuit 126 become problematic when these messages need to be transmitted using some other protocol, such as PCI Express. Accordingly, the present disclosure teaches a method and apparatus to translate the Broadcast messages of HyperTransport™ protocol to PCI Express in order to be understood or identified by the Southbridge 126 and executed. Thus, the translation logic 132 is specifically configured to receive the Broadcast messages and, in particular, map the particular address of the Broadcast message into an address field of a packet constructed according to PCI Express for transmission via the interface 128 to the Southbridge 126. Examples of such mapped packets are illustrated in FIGS. 3 and 4.

The Southbridge includes circuitry as known in the art to receive the transmission from the Northbridge which contains the translated command and to obtain the broadcast message information from the address field of the packet. As such, a system is disclosed which generates the translated command, receives the translated command and further processes the translated command. It will also be recognized that the command may be sent to any suitable device as desired.

Figure 3:
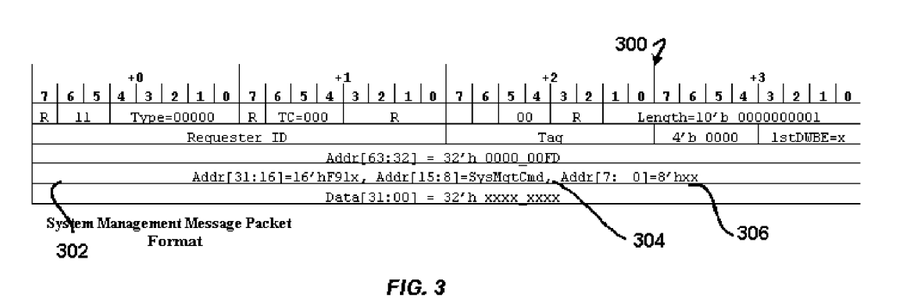
FIG. 3 illustrates an example of a packet format for a Broadcast message performing system management as assembled by a Northbridge for transmission by a PCI Express in accordance with the present disclosure.
Figure 4:
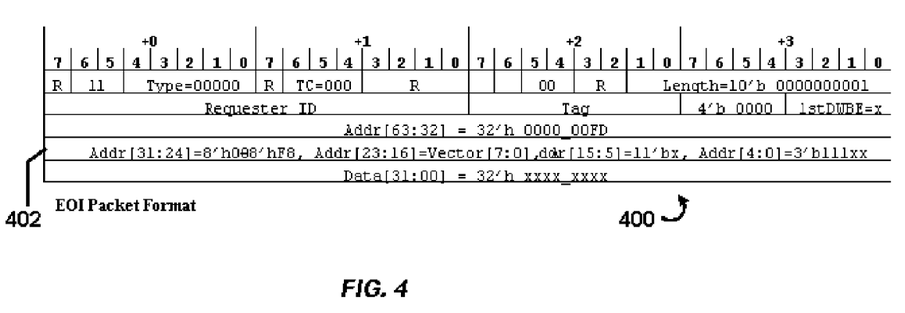
FIG. 4 illustrates an example of a packet frame format for an end of interrupt Broadcast message as assembled for PCI Express according to the present disclosure.

FIG. 3, in particular, illustrates a PCI Express packet that is used to transmit a System Management type Broadcast message. In particular, the packet 300 includes various header data as is known in the PCI Express standard specification, such as detailed in section 2.2 of Rev. 1.1 of the PCI Express specification. Additionally, the address information, which denotes the particular system management message, is mapped into an address field 302 of the PCI Express packet 300.

The packet 300, in particular, is constructed with a double word (dword) memory write command that is recognizable by PCI Express and is comprised of 32 bits, as is well known in the art as the defining characteristic of a dword. Thus, the address field 302 is comprised of 64 bits of information including the 32 dword bits, where the first word or first 16 bits includes the first 16 bits of the HyperTransport™ Broadcast message address (e.g., F91x). The next 8 bits includes the system management command portion of the address 304 and the last 8 bits 306 includes the last 8 bits of the HyperTransport™ Broadcast message address. Alternatively, the data bits 31 through 8 of the double word may be zeroed and the command type in the payload of the Broadcast message is copied to bits 7 through 0 of the double word 300.

Additionally, it is noted that the System Management messages, in particular, may include what is known as "a special cycle." The special cycles may include, as examples, Stop Grant messages, Halt messages, Shutdown messages, and Interrupt messages, which are used for, among other things, power and resource control in a computer system as defined by the HyperTransport™ protocol. These messages each have a particular address, which is within the range of addresses assigned for Broadcast messages as shown in FIG. 2.

FIG. 4 illustrates a packet format for End of Interrupt (EOI) type of Broadcast messages. In particular, the packet 400, similar to the packet of FIG. 3, includes an address field 402 into which the address of the EOI type of Broadcast message is mapped for transmission over the PCI Express interface 128.

It is also noted that the translation logic 132, which is used to perform the above-described translation, may be comprised of hardware, firmware or software. In the case of firmware or software, logic 132 may be executable instructions stored in a memory, such as memory 108 or memory 112 (or a memory within the Northbridge circuit 104), or a combination of a number of different memories in computer system 100 such that when processed by the one or more processors (e.g., CPU 102, Northbridge circuit 104, Southbridge 126 or any combination of processing devices) will perform the translation.

Figure 5:
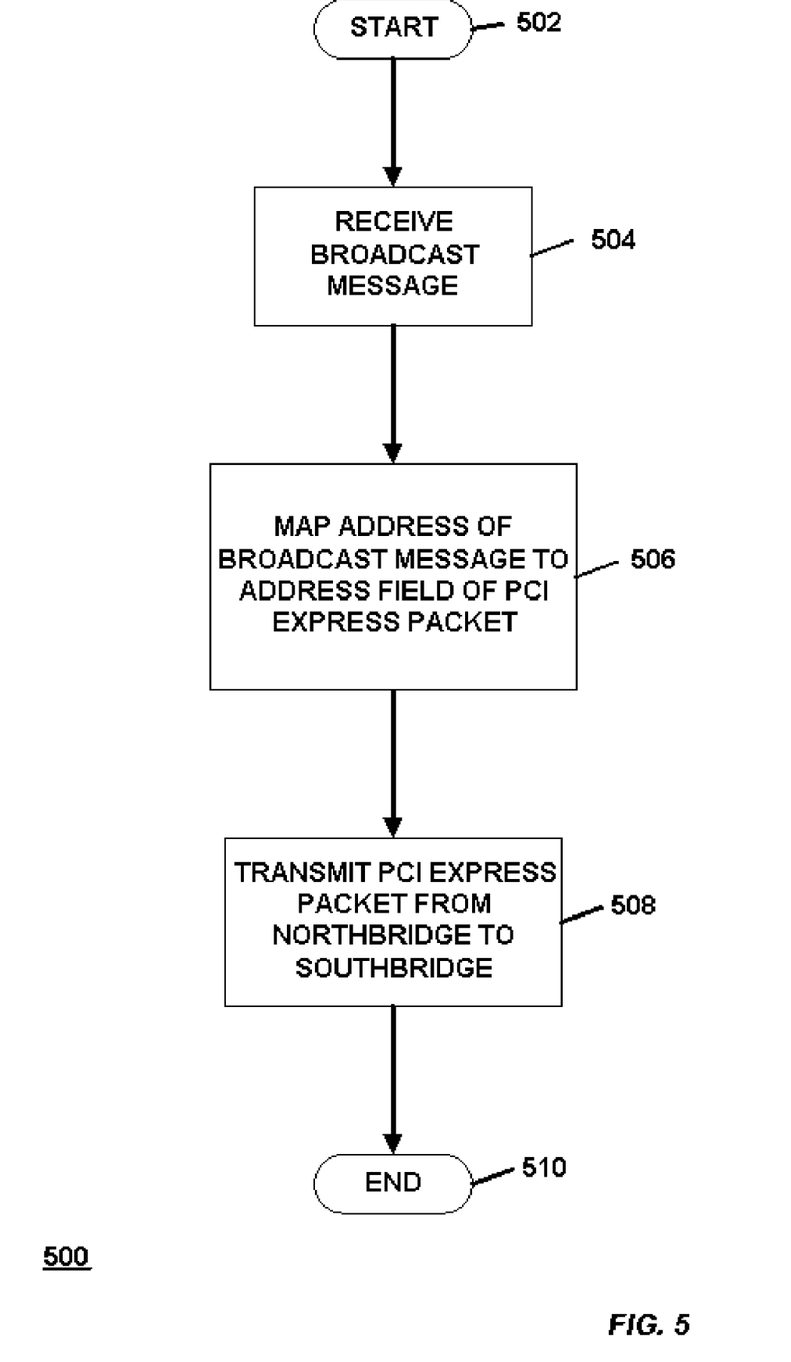
FIG. 5 illustrates an exemplary flow diagram of a method for translating messages in accordance with the present disclosure.

FIG. 5 illustrates a flow diagram of the process by which HyperTransport™ Broadcast messages are translated when, for example, Broadcast messages are issued by the CPU 102 to the rest of the system 100 and, in particular, Southbridge circuit 126 via the Northbridge circuit 104. As illustrated, the process 500 initializes at block 502, and then proceeds to block 504. At block 504, the Broadcast command message is received from a processing unit (e.g., CPU 102). In particular, referring to FIG. 1, the Northbridge 104 receives a Broadcast message according to HyperTransport™ protocol over the interface 106. This process is, in particular, performed by the translation logic 132 within the Northbridge circuit 104. Next, logic 132 then maps the address of the particular Broadcast message into an address field of a packet constructed according to PCI Express as illustrated in block 506. As an example, logic 132 constructs a dword having 32 bits where bits 31 through 8 are zeroed and the address of the Broadcast message, which indicates the type of command, into bits 7 through 0 of the dword.

The PCI Express packet, which is a dword memory write request, is then transmitted as indicated in block 508 to the Southbridge circuit 126 via interface 128 under control of the Northbridge circuit 104 and, in particular, translation logic 132. Once the message is transmitted, the process ends as indicated at block 510.

According to the foregoing description, in computer systems employing a transfer protocol utilizing command messages using an address to communicate commands, such as HyperTransport™, between a central processing unit (CPU) and a Northbridge and also utilizing an interface standard, such as PCI Express for interconnecting a Northbridge to a Southbridge, the presently-disclosed methods and apparatus afford a simplified methodology or apparatus to communicate messages from the CPU to the Southbridge. Additionally, translation allows an existing PCI Express bus path to be utilized instead of a different path.

The above detailed description of the examples described herein have been presented for the purposes of illustration and description only and not by limitation. It is therefore contemplated that the present application cover any and all modifications, variations or equivalents that fall within the spirit and scope of the basic underlying principles disclosed above and the appended claims.

What is claimed is:

1. A method for converting messages in a computer system comprising:
   receiving a broadcast message from a processing unit, wherein the broadcast message is defined according to a first transport protocol and utilizes a range of addresses to identify and communicate commands to devices in the computer system wherein an address field of said broadcast message contains at least one command and wherein said broadcast message does not have a separate data field for containing said at least one command; and
   translating the broadcast message to a message defined by a different transport protocol by mapping the range of addresses into an address field of at least one packet constructed according to the different transport protocol wherein said address field is recognizable by a device using said different transport protocol.

2. The method of claim 1, wherein the address field in the at least one packet constructed according to the different transport protocol is a double word memory write command recognizable by a device using the different transport protocol.

3. The method as defined in claim 1, wherein the first transport protocol requires a link that connects two devices using two unidirectional sets of signals each comprising a command, address and data signal, a control signal and a clock signal, wherein each set of signals constitutes a connection, and wherein the first transport protocol is capable of supporting connections that have the same width and connections that have different widths.

4. The method as defined in claim 1, wherein the broadcast message comprises one of either a system message or an end of interrupt message (EOI).

5. The method as defined in claim 4, wherein the system message includes a special cycle.

6. The method as defined in claim 5, wherein the special cycle includes one of a Stop Grant message, a Halt message, and Shutdown message.

7. The method of claim 1, wherein the different transport protocol requires a link that represents a dual-simplex communications channel between two components to enable communication of packets therebetween, wherein the different transport protocol is capable of supporting only a symmetric number of lanes in each direction of the dual-simplex communications channel, wherein a data clock is embedded in each direction of the dual-simplex communication channel using an encoding scheme and wherein a format field and a type field are used in each packet to describe the type of packet.

8. The method as defined in claim 1, wherein the processing unit is a central processing unit, and the steps of receiving and translation are performed in a Northbridge circuit.

9. A method for converting messages in a computer system comprising:
   receiving a command message from a processing unit, wherein the command message is defined according to a first transport protocol and utilizes an address to identify and communicate commands to devices in the computer system; and translating the command message to a message defined by a different transport protocol by mapping the address into an address field of a packet constructed according to the different transport protocol, wherein the address field in the packet constructed according to the different transport protocol is a double word memory write command recognizable by a device using the different transport protocol and wherein translating the command message further comprises:

zeroing data bits 31 through 8 of the double word; and copying a message type of the command message and payload (address 15:8) into bits 7 through 0 of the double word.

10. A bridge circuit configured to convert messages received from at least one processor, the bridge circuit comprising:

logic configured to:

translate a broadcast message from a processing unit, wherein the broadcast message is defined according to a transport protocol and utilizes a range of addresses to identify and communicate commands to devices, wherein an address field of said broadcast message contains at least one command and wherein said broadcast message does not have a separate data field for containing said at least one command, and wherein translation of said broadcast message includes mapping the range of addresses into an address field of at least one packet constructed according to a different transport protocol; and send the translated command message to a device wherein said device uses said different transport protocol and wherein said address field is recognizable by said device using said different transport protocol.

11. The bridge circuit of claim 10, wherein the address field in the at least one packet constructed according to the different transport protocol is a double word memory write command recognizable by the different transport protocol.

12. The bridge circuit of claim 10, wherein the transport protocol that defines the broadcast message requires a link that connects two devices using two unidirectional sets of signals each comprising a command, address and data signal, a control signal and a clock signal, wherein each set of signals constitutes a connection, and wherein the transport protocol that defines the broadcast message is capable of supporting connections that have the same width and connections that have different widths.

13. The circuit of claim 10, wherein the broadcast message comprises one of either a system message or an end of interrupt message (EOI).

14. The circuit as defined in claim 13, wherein the system message includes a special cycle.

15. The circuit as defined in claim 14, wherein the special cycle includes one of a Stop Grant message, a Halt message, and Shutdown message.

16. The circuit as defined in claim 10, wherein the different transport protocol requires a link that represents a dual-simplex communications channel between two components to enable communication of packets therebetween, wherein the different transport protocol is capable of supporting only a symmetric number of lanes in each direction of the dual-simplex communications channel, wherein a data clock is embedded in each direction of the dual-simplex communication channel using an encoding scheme and wherein a format field and a type field are used in each packet to describe the type of packet.

17. The circuit as defined in claim 10, wherein the processing unit is a central processing unit, and the bridge circuit is a Northbridge circuit.

18. A bridge circuit configured to convert messages received from at least one processor, the bridge circuit comprising:

logic configured to:

translate a command message from a processing unit, wherein the command message is defined according to a transport protocol and utilizes an address to identify and communicate commands to devices by mapping the address into an address field of a packet constructed according to a different transport protocol, wherein the address field in the packet constructed according to the different transport protocol is a double word memory write command recognizable by the different transport protocol, and, wherein translate the command message includes zeroing data bits 31 through 8 of the double word, and copying the command-type and payload (address 15:8) into bits 7 through 0 of the double word; and send the translated command message to a device.

19. A storage medium comprising:

memory containing executable instructions such that when processed by one or more processors causes at least one processor to:

receive a broadcast message from a processing unit, wherein the broadcast message is defined according to a transport protocol and utilizes a range of addresses to identify and communicate commands to devices in the computer system wherein an address filed of said broadcast message contains at least one command and wherein said broadcast message does not have a separate data field for containing said at least one command;

translate the broadcast message to a message defined by a different transport protocol by mapping the range of addresses into an address field of at least one packet constructed according to the different transport protocol; and send the translated message to a device wherein said device uses said different transport protocol and wherein said address field is recognizable by said device using said different transport protocol.

20. The storage medium of claim 19, wherein the address field in the at least one packet constructed according to the different transport protocol is a double word memory write command recognizable using the different transport protocol.

21. The storage medium of claim 19, wherein the transport protocol that defines the command message requires a link that connects two devices using two unidirectional sets of signals each comprising a command, address and data signal, a control signal and a clock signal, wherein each set of signals constitutes a connection, and wherein the transport protocol that defines the command message is capable of supporting connections that have the same width and connections that have different widths.

22. The storage medium of claim 19, wherein the broadcast message comprises one of either a system message or an end of interrupt message (EOI).

23. The storage medium of claim 22, wherein the system message includes a special cycle.

24. The storage medium as defined in claim 23, wherein the special cycle includes one of a Stop Grant message, a Halt message, and Shutdown message.

25. The storage medium as defined in claim 19, wherein the different transport protocol requires a link that represents a dual-simplex communications channel between two components to enable communication of packets therebetween, wherein the different transport protocol is capable of supporting only a symmetric number of lanes in each direction of the dual-simplex communications channel, wherein a data clock is embedded in each direction of the dual-simplex communication channel using an encoding scheme and wherein a format field and a type field are used in each packet to describe the type of packet.

26. The storage medium as defined in claim 19 wherein the processing unit is a central processing unit, and the steps of receiving and translation are performed in a Northbridge circuit.

27. A storage medium comprising: memory containing executable instructions such that when processed by one or more processors causes at least one processor to:
   receive a command message from a processing unit, wherein the command message is defined according to a transport protocol and utilizes an address to identify and communicate commands to devices in the computer system; and
   translate the command message to a message defined by a different transport protocol by mapping the address into an address field of a packet constructed according to the different transport protocol, wherein the address field in the packet constructed according to the different transport protocol is a double word memory write command recognizable using the different transport protocol and wherein translating the command message further comprises:
   zeroing data bits 31 through 8 of the double word; and
   copying a message type of the command message and payload (address 15:8) into bits 7 through 0 of the double word.

28. A bridge circuit comprising logic configured to interpret a translated command message that has been translated from a broadcast message sent from a processing unit, wherein the broadcast message was defined according to a transport protocol and utilizes a range of addresses to identify and communicate commands to devices wherein an address field of said broadcast message contains at least one command and wherein said broadcast message does not have a separate data field for containing said at least one command, and wherein the translated command message includes data representing a translation of the command message to a different transport protocol by mapping the range of addresses into an address field of at least one packet constructed according to the different transport protocol, wherein said address field is recognizable by a device using said different transport protocol.

29. A system comprising:
   logic configured to:
   translate a broadcast message from a processing unit, wherein the broadcast message is defined according to transport protocol and utilizes a range of addresses to identify and communicate commands to devices, wherein an address field of said broadcast message contains at least one command and wherein said broadcast message does not have a separate data field for containing said at least one command, and wherein translation of said broadcast message includes mapping the range of addresses into an address field of at least one packet constructed according to the different transport protocol to obtain a translated command message; and
   send the translated command message to a device that uses said different transport protocol wherein said address field is recognizable by said device using said different transport protocol; and
   logic configured to interpret the translated command message.

* * * * *